United States Patent Office 3,338,852
Patented Aug. 29, 1967

3,338,852
HIGHLY FILLED PLASTICIZED CHLORINATED POLYETHYLENE - POLYVINYL CHLORIDE FLOOR COVERING
Algirdas A. Reventas, Rockaway, Wilbur F. Chapman, Convent Station, and John Pisanchyn, Morristown, N.J., assignors to Allied Chemical Corporation, New York, N.Y., a corporation of New York
No Drawing. Filed Aug. 31, 1962, Ser. No. 220,876
5 Claims. (Cl. 260—17.4)

This invention relates to floor covering and more particularly refers to new and improved composition for production of superior floor covering or tile.

Commerical floor covering or tile is produced in large quantities from compositions composed mainly of filler, plasticizer, and a vinyl resin binder which is generally a polyvinyl chloride resin or a vinyl chloride/vinyl acetate copolymer resin such as that used in the "Vinylite" tile compositions. In the manufacture of such compositions, the basic formulation of vinyl resin, filler and plasticizer are compounded in a machine such a Banbury Mixer and then sheeted to the desired thickness, usually on the mill and then calendered and press-molded. Two types of vinyl floor products are generally produced. The first or so-called "semi-flexible" compositions contain predominantly the fibrous fillers, generally asbestos. The other or "flexible" type compositions are those containing the granular or pigment-type fillers. The "semi-flexible" compositions take by far the largest share of the market because of their relatively low cost which is made possible by ability to load the vinyl resin binders with the fibrous fillers to a high degree, the "semi-flexible" tiles generally containing about 80–85% filler and only about 10–15% of the more expensive vinyl component. The "flexible" or pigment-filled type floor tiles which are the more attractive and durable are also the more expensive and have become known as "premium" tiles because of a relatively low tolerance of the vinyl resin binders for the granular and pigment-type fillers, the usual ratio of filler to vinyl resin binder being approximately 100 pounds filler per 100 pounds vinyl binder. Generally, the loading of the "flexible" type tile compositions with more than 100–200 pounds of filler per 100 pounds of vinyl binder results in deterioration of the product, particularly with respect to flexibility and wearing qualities. A further drawback of the vinyl compositions is the relatively high plasticizer requirements, generally of the order of 10–15 or more percent. This not only substantially adds to the cost of the product but because of its fugitive nature the plasticizer tends to bleed from the composition which may even cause staining of the tile as well as a depreciation in permanency of the product.

Many efforts were made to overcome the disadvantages of the vinyl resin tile compositions but with only partial or insignificant success. Considerable work was directed toward the use of chlorinated polyethylene instead of polyvinyl chloride but it was found, for one or more reasons, that the product did not overcome the disadvantages of the vinyl resins. For example, as disclosed in U.S. patent 2,467,550 of April 19, 1949, chlorinated polyethylene produced by the high pressure process and of generally low molecular weight was suggested as binder for the floor tile but such formulations were found to be generally inadequate and particularly would not result in an improvement in filler loading capacity. Similarly, other chlorinated polyethylene compositions were suggested, as for example in U.S. Patent 2,541,987 of February 20, 1951, but did not overcome the disadvantages of the vinyl resins and failed to gain acceptance in the production of floor tile compositions.

An object of the present invention is to provide a superior floor tile composition which overcomes the disadvantages of the polyvinyl chloride floor composition. Another object of the present invention is to provide a low cost "flexible" floor tile composition which will have properties as good as or better than polyvinyl chloride floor tile. A further object of the present invention is to provide a readily processable floor composition which requires less than half the quantity of plasticizer employed in polyvinyl chloride composition. Other objects and advantages of the present invention will be apparent from the following discussion.

In the course of investigation with various compositions for the production of floor tiles it was found that while chlorinated polyethylene is generally unsatisfactory, a chlorinated polyethylene having certain defined characteristic properties may be employed as binder to produce floor tile compositions which in some respects have definite superiority and advantages over the conventional vinyl compositions. These chlorinated ethylene polymers must have a chlorine content of greater than about 40% and less than about 70% chlorine by weight and a high molecular weight as reflected by an intrinsic viscosity within the range of about 1.8 to 5.0 in o-dichlorobenzene at 100° C., such chlorinated high molecular weight polyethylene being prepared by chlorination of a crystalline, low pressure, high density polyethylene having a molecular weight of at least about 1.0 million to 5.0 million. When used as binder the indicated chlorinated high molecular weight polyethylene was found to produce floor tile compositions of remarkably good properties at least equivalent to the vinyl tile compositions and superior in such important tile properties as flexibility, tensile strength, and crease resistance. Economically, the indicated chlorinated polyethylene tile compositions were found to afford unexpected advantages in that the chlorinated high molecular weight polyethylene permitted the use of substantially greater amounts of filler and substantially less amounts of plasticizer while producing a floor tile which is superior to the conventional vinyl products. These chlorinated polyethylene tile compositions therefore are suitable for the production of the so-called "preminum" or "flexible" floor tiles employing pigment or granular fillers. Using the indicated chlorinated polyethlene as binder it is possible to produce the more attractive, more durable "premium" tiles at about the same cost as the "semi-flexible" fibrous-filled tile compositions because substantially less amounts of the more expensive resin binder are required and still, the new low cost "premium" tile is superior to the prior art tile compositions which consumed larger amounts of the vinyl resins.

Utilizing the indicated chlorinated high molecular weight polyethylene as binder together with filler and small quantities of plasticizer we were able to produce superior tile compositions on small scale laboratory equipment. However, in processing these same formulations in conventional commercial equipment such as the Banbury Mixer, we encountered practical difficulties as it was found that the chlorinated high molecular weight polyethylene compositions were quite refractory and resulted in an extremely slow rate of processing compared to the rate of production using conventional vinyl material, the production rate being only one-half that of the rate of processing polyvinyl chloride compositions. Thus, while the product obtained had the superior properties of the chlorinated polyethylene the important economic advantages offered by the chlorinated polyethylene were diminished due to the refractory nature of material during processing.

In the course of experimentation we attempted to alter the properties of the chlorinated polyethylene to eliminate the refractory nature of the material but in doing so we found that we depreciated the other desirable properties of the chlorinated polyethylene so that it was generally unsatisfactory for use in floor tile compositions. In other attempts to overcome this difficulty, we added large amounts of plasticizer to the chlorinated polyethylene and while it did in part overcome the refractory character of the chlorinated polyethylene the resulting product was still unsatisfactory, generally for the reason that the large amounts of plasticizer required resulted in a product which lacked the necessary dimensional stability.

Experimentation was continued in an attempt to find a solution to the problem of eliminating the refractory nature of the chlorinated polyethylene until it was found that a satisfactory solution to the problem was obtained by a floor tile composition in which the binder is composed of about 40% to 80% by weight of the indicated high molecular weight chlorinated polyethylene and from about 20% to 60% by weight of a lower molecular weight vinyl resin selected from the group consisting of polyvinyl chloride, vinyl chloride/vinyl acetate copolymer resins and mixtures of polyvinyl chloride and polyvinyl acetate containing predominantly polyvinyl chloride. By using the chlorinated high molecular weight polyethylene in combination with the indicated limited amount of low molecular weight vinyl resin we are able to obtain more than a 100 percent increase in processing rate and achieved high speed processing in the Banbury Mixer and other commercial equipment. Although it might be expected by its known characteristics that polyvinyl chloride would have a detrimental effect on the advantageous tile forming properties of the chlorinated polyethylene, it was found that this was not the case. More specifically, the vinyl resin based on past experience would have been expected to reduce the filler loading capacity by at least about 25 percent. Surprisingly, we found that filler loading capacity was not reduced but remained at a remarkably high level. Additionally, the tile compositions incorporating the chlorinated polyethylene-low molecular weight vinyl resin binder of the invention retained to a high degree all the excellent tile forming properties of the chlorinated polyethylene, particularly with respect to tensile strength, flexibility, indentation recovery, and crease resistance. Furthermore, plasticizer requirements were not increased and remained at the same minimum level or less as obtained with compositions based solely on the chlorinated high molecular weight polyethylene binder. It was also found of particular importance that dimensional stability of the floor tile product was improved over those containing only the chlorinated high molecular weight polyethylene material.

In accordance with the invention an improved floor tile composition therefore comprises: (A) about 100 parts by weight of a resin binder composed of from about 40% to 80% by weight of high molecular weight chlorinated polyethylene and from about 20% to 60% by weight of a lower molecular weight vinyl resin selected from the group consisting of polyvinyl chloride, vinyl chloride/ vinyl acetate copolymers and mixtures of polyvinyl chloride and polyvinyl acetate containing predominantly polyvinyl chloride, said chlorinated high molecular weight polyethylene having a chlorine content of about 40–70%, and intrinsic viscosity within the range of about 1.8 to about 5.0 in o-dichlorobenzene at 100° C. and prepared by chlorination of a crystalline, low pressure, high density, substantially linear polyethylene having a molecular weight of at least about 1.0 million to 5.0 million and density of 0.935 to 0.985, said vinyl resin having an intrinsic viscosity within the range of about 0.2 to 1.0 in o-dichlorobenzene at 100° C. and a density of about 1.30 to 1.40; and (B) about 300 to 700 parts by weight filler, preferably about 350 to 500 parts by weight filler.

The chlorinated ethylene polymers employed in the make-up of the composition of the present invention are preferably prepared by two-stage chlorination of the low pressure, high density, high molecular weight polyethylene. The first stage involves chlorination of a solid, crystalline, microporous, essentially saturated, low pressure polymer of ethylene having a molecular weight within the range of at least about 1.0 million to 5.0 million, in aqueous slurry at a temperature below the crystalline melting point of the polymer until at least about 5%, preferably about 17%, of chlorine has been introduced into the polymer. In the second stage of the process the chlorination is continued in the aqueous slurry at a temperature maintained above the crystalline melting point of the polymer and below the softening point of the chlorinated outer coating thereof, generally a temperature of about 135° C. to 145° C. Chlorination in the second stage may be carried out above the crystalline melting point until the desired 40–70% chlorine is added or until a lesser amount, e.g. 25% to 30% chlorine has been added, and the chlorination then continued at a lower temperature, e.g. 110° C. to 120° C. until the desired 40–70% chlorine is added.

The low pressure, high density, high molecular weight polyethylene employed as a starting material for the preparation of the chlorinated polyethylene in the above process may be produced, as described in British Patent 858,674 of January 11, 1961 to Allied Chemical Corporation, by gas phase polymerization of an anhydrous, oxygen-free ethylene over a porous frangible supported catalyst prepared from an inorganic compound of chromium and oxygen and an active alkyl metal. The crystalline high density polyethylene for use as starting material in preparation of the chlorinated polyethylene materials has a density between about 0.935 and about 0.985 and a weight average molecular weight between about 1.0 million and about 5.0 million calculated according to the method of P. S. Francis et al. from the viscosity of about 0.05 to 0.1 gram per 100 cc. solution in Decalin using the equation:

$$[n] = 6.77 \times 10^{-4} M^{0.67}$$

where $[n]$ = intrinsic viscosity
$M$ = weight average molecular weight (J. Polymer Science vol. 31, pp. 453–466, September 1958.)

The chlorinated polyethylene containing 40–70% chlorine as obtained by the above processes from low pressure polyethylene having a molecular weight of at least about 1.0 to 5.0 million is essentially noncrystalline in structure and will have an intrinsic viscosity of about 1.8 to 5.0 in o-dichlorobenzene at 100° C., with the 50 to 55% chlorine material having an intrinsic viscosity of between about 3.0 and 4.5. Glass transition or brittle temperatures range from about −5° C. for the 40% chlorine material to about 150° C. for the 70% chlorine material with the preferred 50–55% chlorine polymers corresponding to a range of brittle temperatures from about 35° C. to about 75° C. The chlorinated polyethylene material containing 40–70% chlorine is amorphous or essentially non-crystalline with generally less than about 5% crystallinity, usually less than about 1% crystallinity. They are chemically inert, being insoluble at 20–25° C. in organic solvents such as esters, acids, and alcohols and have tensile strength values according to ASTM method D. 638–58 T (at a drawing rate of 2 inches per minute) of at least about 5,500 p.s.i., usually between about 5,500 p.s.i. and about 8,000 p.s.i. They have true ultimate tensile strengths according to ASTM method D. 638–58 T of at least about 8,000 p.s.i.; the preferred chlorinated polyethylenes of between about 50% and about 55% chlorine content have true ultimate tensile strengths between about 14,000 p.s.i. and about 15,000 p.s.i. They have infrared spectrograms showing characteristic absorption peaks at the following wave lengths: 3.42 to 3.5 microns; 3.38 to 3.48 microns; 6.8 to 6.9 microns; and 7.8 to 7.9 microns, the spectra being obtained on thin films prepared by compression molding at 190° C. with a Perkin-Elmer model 21 infrared spectrometer using sodium chloride optics and a 927 program for determining slit width and resolution. The values given are those recorded in terms of intensities of light transmission at various wave lengths from 2 to 20 microns.

The high molecular weight chlorinated polyethylene used in the tile composition of the invention should have a chlorine content of but 40–70% chlorine. The tendency on the part of composition based on chlorinated high molecular weight polyethylene to exhibit "nerve" in processing below about 48% chlorine is reduced in the presence of the low molecular weight vinyl resins so that chlorinated high molecular weight polyethylene having chlorine contents as low as about 40% may be used in combination with the low molecular weight vinyl resins in forming the resin binders for use in the present invention. Below about 40% chlorine the chlorinated polyethylene material tends to produce a tile composition having less than the desired standard of dimensional stability. Chlorination of the high molecular weight polyethylene above about 70% chlorine is generally slower and more difficult than to the lower chlorine contents and the chlorinated polyethylene obtained also requires larger amount of plasticizer to produce a tile composition having the desired superior flexibility. We generally prefer to employ a chlorinated high molecular weight polyethylene having between about 48 to 65% chlorine, most desirably a chlorinated polyethylene having between about 50 and 55% chlorine.

Vinyl resins which are combined with the chlorinated polyethylene as binder in the composition of the invention are those selected from the group consisting of polyvinyl chloride and copolymers of vinyl chloride and vinyl acetate containing predominantly vinyl chloride. Suitable copolymers may be obtained commercially, for example, those copolymers containing about 85% vinyl chloride and 15% vinyl acetate. The vinyl resins which may be employed have a density between 1.3 and 1.4, and a molecular weight corresponding to an intrinsic viscosity between about 0.2 and about 1.0 in o-dichlorobenzene at 100° C. Best results are obtained when the low molecular weight vinyl resins are employed. The polyvinyl chloride resins having an intrinsic viscosity of about 0.2 to 0.5 are therefore those most preferred for use in the indicated proportions with the high molecular weight chlorinated polyethylene as binder for the improved tile compositions of the invention. Satisfactory results may also be obtained using blends of the low molecular weight polyvinyl chloride and polyvinyl acetate resins, the blends containing the higher percentages of the polyvinyl chloride resin being generally preferred.

As indicated, the resin binder used in the tile compositions of the invention contains chlorinated high molecular weight polyethylene and within the range of about 20% to 60% of the low molecular weight vinyl resin. Generally, at least about 20% by weight of the low molecular vinyl resin is required to obtain a tile composition which can be processed at the desired high rates. Above about 60% by weight of the vinyl resin the advantageous properties imparted to resulting tile compositions by the chlorinated polyethylene are rapidly depreciated. The preferred binders for the compositions of the invention are those containing between about 45% to 60% of the chlorinated polyethylene and about 40% to 55% of the vinyl resin.

While the amount of the chlorinated high molecular weight polyethylene-vinyl resin binder combined with other ingredients such as filler and plasticizer, etc. may vary fairly widely, we prefer to utilize the high filler loading capacity of the chlorinated polyethylene and generally employ the chlorinated polyethylene-vinyl resin binder in an amount not exceeding more than about 35% by weight of the total composition, even in the formulation of the "flexible" or pigment-filled type tile compositions.

In the case of asbestos-filled or other "semi-flexible" tiles, as low as 10%, or less, by weight of the total composition of the indicated chlorinated high molecular weight polyethylene-vinyl resin binder may be used to produce acceptable tiles or other sheet material. Thus, filler contents in the "semi-flexible" compositions may be as high as 85% by weight, or more, and ratios of filler to resin binder may be as high as 7 to 1. The "semi-flexible" tile compositions preferably contain about 10–20% of the chlorinated polyethylene-vinyl resin binder and about 75–85% filler with ratios of filler to binder being about 6.5:1 to 5:1.

In the formulation of "flexible" or pigment-filled type floor tile compositions to which the invention is most advantageously applied the chlorinated polyethylene-vinyl resin binder may constitute as little as about 12% by weight of the total tile composition. Thus, filler contents may be as high as about 82% with ratio of filler to binder as high as about 6.5 to 1. Preferred "flexible" type floor tile compositions contain about 15–22% of the chlorinated polyethylene-vinyl resin binder with filler contents lying within the range of about 70% to about 78% and ratios of filler to binder being within the range of about 5:1 to 3.5:1. The more preferred "flexible" or pigment-filled tile compositions contain about 15% to 18% to the resin binder and have filler contents of about 72% to 78% with ratio of filler to binder within the range of about 5:1 to 4:1.

Generally, the actual percentage of plasticizer employed in tile compositions depends to a large extent on the amount and inherent flexibility of the binder used. The tile compositions of the present invention maintain the excellent flexibility of the chlorinated high molecular weight polyethylene at the higher ratios of filler to resin binder and considerably lower ratios of plasticizer to resin binder may be employed to produce satisfactory products than in the case of the prior art compositions formulated using predominantly the vinyl chloride resins as binder. Thus, plasticizer content may be as low as 4% and preferably lies within the range of about 4% to 8% by weight of the total tile composition. Plasticizer in an amount up to about 15% by weight of the tile composition may be used, if desired. Proportions of plasticizer as low as 1 part plasticizer or less to 3 parts of the chlorinated polyethylene-vinyl resin binder may be used to produce tiles having outstanding flexibility even at the higher filler contents up to about 70–75% whereas the prior art vinyl chloride polymer compositions must use considerably higher ratios of plasticizer to resin, e.g. about 1:1 or at least 1:2, to provide compositions having even passable flexibility for tile compositions, and even at these ratios, the vinyl chloride polymer compositions are vastly inferior in this respect to compositions containing the chlorinated high molecular weight polyethylene vinyl resin binder.

Among the conventional plasticizers which may be employed we prefer to use the esters and the epoxidized drying oils. The more preferred esters are the monomeric esters of acids such as phosphoric, phthalic, adipic, sebacic, etc. Suitable alcohols for forming the monomeric esters having generally about 4 to 16 carbon atoms, more usually 4 to 12 carbon atoms. Examples of such plasticizers include tricresyl phosphate, dioctyl phthalate, 2-ethylhexyl phthalate, diisodecyl phthalate, butylcyclohexyl phthalate, dicyclohexyl phthalate, dicapryl phthalate, dioctyl adipate, and dibutyl sebacate. Epoxidized soya bean oil is a preferred example of an epoxidized drying oil which may be used in formulation of the tile compositions.

Suitable filler materials include both the pigment fillers and fibrous fillers. Examples of pigment fillers are the clays, calcium carbonate, barytes, asbestine, talc, calcium sulfate, silica, mica, etc., as well as conventional colored pigments such as titanium dioxide, carbon black, phthalocyanine green or blue, chrome yellows, etc. Coarse fillers such as pulverized marble or limestone may also be used, if desired.

Suitable fibrous fillers include asbestos, cork, wood flour, etc. Various combinations of pigment, coarse and fibrous fillers may, of course, also be used.

Stabilizers may also be included in the compositions to protect the chlorinated high molecular weight polyethylene against possible decomposition by the heat of processing, etc. Such stabilizers as are conventional in the preparation of vinyl polymer and copolymer sheet compositions are suitable, for example, organic complexes and/or salts of lead, tin, barium, cadmium, zinc, sodium, etc. The usual small quantities of such stabilizers are effective; for instance, 2 to 10 parts per 100 parts of chlorinated high molecular weight polyethylene.

The folowing examples further illustrate the advantages of the tile compositions of the present invention. In the examples parts are by weight except as otherwise noted.

EXAMPLE 1

There was prepared a highly filled flexible floor tile composition with ratio of 5 parts by weight filler to 1 part by weight of a resin binder composed of 75% chlorinated high molecular weight polyethylene and 25% of a low molecular weight polyvinyl chloride.

The chlorinated high molecular weight polyethylene had a chlorine content of 55% and an intrinsic viscosity of about 3.6 in o-dichlorobenzene at 100° C., and was prepared from a low pressure, crystalline, high density, polyethylene having a molecular weight of about 2.7 million in accordance with the method of U.S. application Serial No. 86,309 of February 1, 1961 (Examples 1 and 2) by two-stage chlorination in aqueous suspension with chlorination in the first stage to a chlorine content of about 17% at a temperature below about 100° C. and in the second stage to 55% chlorine at a temperature of about 138–145° C. The polyethylene employed was prepared in accordance with British Patent 858,674 (Example 6).

The polyvinyl chloride resin employed in the make-up of the binder had an intrinsic viscosity of about 0.3, a density of about 1.40, an elongation of 10%, a tensile strength of about 7,000 p.s.i., and a true ultimate tensile strength of about 8,000 p.s.i.

The total composition had the following specific formulation:

TABLE I

| Ingredient: | Parts by weight |
|---|---|
| Resin binder | 100 |
| Diethylhexylphthalate | 35 |
| Epoxidized soya bean oil | 5 |
| Barium-zinc organic stabilizer | 3 |
| Polyethylene wax | 2 |
| Stearic acid | 1 |
| Calcium carbonate | 350 |
| Kaolin clay | 150 |
| Titanium dioxide (TiO$_2$) | 20 |
| Total parts | 666 |

| | Percent |
|---|---|
| Total filler | 78.1 |
| Total resin binder plus plasticizer | 21.9 |

5 pounds of the tile composition of Table I was processed on a standard Banbury Mixer, Model No. B, for about 5 minutes to a drop temperature of about 320° F. Sheets of the composition were then formed on a two-roll mill at a roll temperature of 300° F. and press-molded into standard 9" x 9" x ⅛" floor tiles. The composition was processed on the Banbury and sheeted out on the mill without exhibiting nerve, toughness, or dryness. Plasticity of the composition for high rate processing was evaluated by measuring the power in kilowatts required for processing of the composition on the Banbury. Power ratings of less than 12 kilowatts (at peak) and less than 8 kilowatts (at drop) are indicative of a tile composition having sufficient plasticity to be processed at high rates. Physical properties of the floor tiles produced from the composition were determined according to the procedures and standard for plastic type floor tiles set forth in Interim Federal Specification L–T–751 (GSA–FSS) 18 March 1952, and according to ASTM standards and procedures for such materials. Results obtained are summarized below in Table II:

TABLE II

| Processing: | Rating |
|---|---|
| Banbury power: | |
| KW (at peak) | 10.7 |
| KW (at drop) | 7.0 |

| Properties: | Evaluation |
|---|---|
| McBurney indentation—1 min. at 73° F., mils | 15 |
| Hardness, Shore D | 70 |
| Dimensional stability—After annealing (6 hrs. at 180° F.) inches/linear foot | 0.009 |
| Flexibility—180° bend around 1" mandrel | passed |

The results obtained and tabulated in Table II show that the tile composition more than adequately meets the plasticity requirements for high speed processing with Banbury power ratings of 10.7 kilowatts (at peak) and 7.0 kilowatts (at drop) being decidedly within the 12 and 8 kilowatt standard for the respective ratings. The physical properties obtained for the tile composition show a high degree of retention of the excellent properties of the high molecular weight chlorinated polyethylene. Comparison of the properties obtained with the ASTM and Interim Federal Standard Specifications show a floor tile composition of excellent quality. It was also noted that dimensional stability of the annealed tile compositions utilizing the chlorinated polyethylene-vinyl resin binder was improved to an exceptionally low value of 0.009 inches per linear foot or better than that obtained in compositions in which a chlorinated polyethylene is used as binder indicating that dimensional stability as well as plasticity was improved by use of the chlorinated polyethylene-vinyl resin binder of the present invention while retaining the outstanding chlorinated polyethylene tile properties including high filler loading capacity.

EXAMPLE 2

A second highly filled flexible floor tile composition has a resin binder composed of 50% of the same chlorinated high molecular weight polyethylene employed in Example 1 and 50% of the same low molecular weight polyvinyl chloride employed in Example 1, the ratio of filler to resin binder in the floor tile composition being about 4.7 to 1. The specific formulation of the composition is given below in Table III:

TABLE III

| Ingredient: | Parts by weight |
|---|---|
| Resin binder | 100 |
| Diethylhexylphthalate | 35 |
| Epoxidized soya bean oil | 5 |
| Barium-zinc organic stabilizer | 3 |
| Polyethylene wax | 2 |
| Stearic acid | 2 |
| Calcium carbonate | 300 |
| Kaolin clay | 150 |
| Titanium dioxide (TiO$_2$) | 20 |
| Total parts | 617 |

| | Percent |
|---|---|
| Filler | 76.1 |
| Total resin binder plus plasticizer | 22.7 |

Method of preparation of press-molded floor tile samples is the same as in Example 1 with the composition processed on the Banbury without exhibiting nerve, toughness or dryness. Banbury power requirements and physical properties of the floor tile composition are summarized below in Table IV.

TABLE IV

| Processing | Rating |
|---|---|
| Banbury power: | |
| KW (at peak) | 9.0 |
| KW (at drop) | 5.0 |
| Properties | Evaluation |
| McBurney indenation—1 min. at 73° F., mils. | 21 |
| Hardness Shore D | 58 |
| Dimensional stability—After annealing (6 hrs. at 180° F.) inches/linear foot | 0.006 |
| Flexibility—180° bend around 1″ mandrel | passed |

The results obtained and tabulated in Table IV show that the tile composition containing the resin binder composed of 50% chlorinated polyethylene and 50% polyvinyl chloride more than adequately meets the plasticity requirements for high speed processing with particularly excellent Banbury power ratings of 9.0 kilowatts (at peak) and 5.0 kilowatts (at drop). The physical properties of the tile composition show a high degree of retention of the excellent properties of the high molecular weight chlorinated polyethylene including a surprisingly high filler loading capacity substantially equivalent to the higher capacities obtained with the high molecular weight chlorinated polyethylene when used alone.

EXAMPLES 3 AND 4

Two highly filled floor tile compositions having a resin binder containing predominantly chlorinated high molecular weight polyethlene and moderate proportion of a vinyl chloride-vinyl acetate copolymer were prepared to demonstrate the use of a chlorinated polyethylene-vinyl copolymer resin binder in the production of tile compositions having plasticity suitable for high speed processing. For convenience these compositions are designated as composition "A" and composition "B." In composition "A" the resin binder was composed of 75% chlorinated high molecular weight polyethylene and 25% of the vinyl copolymer resin. In composition "B" the resin binder was composed of 65% of the chlorinated high molecular weight polyethylene and 35% of the vinyl copolymer resin.

Two additional floor tile compositions were prepared for purposes of comparison. In composition designated as composition "C" the resin binder consisted essentially of the chlorinated high molecular weight polyethylene. In composition designated as composition "D" the resin binder consisted essentially of the vinyl copolymer resin. Plasticity of composition "D" was determined and found to be eminently suited for processing at high rates in conventional equipment. Plasticity of composition "D" was therefore assigned an index of 100 for purposes of comparison. The chlorinated high molecular weight polyethylene used in the make-up of compositions "A," "B," and "C" had a chlorine content of 54% by weight and intrinsic viscosity of about 3.5 in o-dichlorobenzene at 100° C. and was prepared from a low pressure, crystalline, high density, polyethylene having a molecular weight of 2.7 million by chlorination of the polyethylene in finely divided form with gaseous chlorine in the presence of an inert gas at a temperature of about 73° C. in accordance with U.S. Patent application Ser. No. 819,106 of June 9, 1959.

The vinyl copolymer resin used in the make-up of compositions "A," "B" and "D" was a copolymer of 85% vinyl chloride and 15% vinyl acetate having a density of about 1.36, an intrinsic viscosity of about 0.3 in o-dichlorobenzene at 100° C., a tensile strength of about 7,000 p.s.i., and a true ultimate tensile strength of about 8,000 p.s.i. The indicated vinyl copolymer resin employed and is of the type commonly used as binder in formulation of floor tile compositions.

All 4 of the compositions had a ratio of filler to resin binder of about 4 to 1 and the specific formulation given in Table V, below.

TABLE V

| Ingredient: | Parts by weight |
|---|---|
| Resin binder | 100 |
| Dioctyl phthalate | 25 |
| Butyl benzylphthalate | 25 |
| Epoxidized soya bean oil | 5 |
| Barium-zinc organic stabilizer | 3 |
| Barium-sodium organic stabilizer | 2 |
| Stearamide | 1 |
| Green organic pigment | 1 |
| Calcium carbonate | 190 |
| Kaolin clay | 190 |
| Titanium dioxide ($TiO_2$) | 20 |
| Total parts | 562 |
| | Percent |
| Total filler | 71.3 |
| Total resin binder plus plasticizer | 28.7 |

Plasticity of all compositions was determined by subjecting a 1 gram sample of the granulated composition to a pressure load of 5,000 pounds at a temperature of 150° C. for ½ minute in a Carver Press. Plasticity of compositions "A," "B," and "C" was measured as a percentage of the area of the disc formed by these compositions compared to the area of the disc formed by control composition "D" to which was assigned an index of 100. The tile compositions were also separately milled on a standard rubber mill for about 5–10 minutes to a roll temperature of about 147° C. and sheets of each composition press molded into ⅛ inch thick sheets. A 1″ x 6″ strip of each sheet was subjected to a 180° angle bend Mandrel test and Mandrel size in inches recorded at failure as determined by cracking or breaking of the strip. The Mandrel flexibility test was conducted in accordance with the Interim Federal Specification L–T–751 (GSA-FSS) 18 March 1952, which requires that a floor tile composition bend around a 1″ Mandrel. Indentation recovery at 73° F. after 1 minute was also determined for each of the compositions.

Results obtained for each of the compositions "A," "B," "C," and "D" are summarized below in Table VI wherein in the rating of "Mandrel Flexibility," "P" designates passing the test and "F" designates failure of the test.

TABLE VI

| Composition | "A" | "B" | "C" | "D" |
|---|---|---|---|---|
| Characteristics: | | | | |
| Plasticity, based on Composition "D" | 99 | 107 | 79.6 | 100 |
| McBurney Indentation Recovery, at 73 F. after 1 min., percent | 60 | 63.6 | 66.8 | 45 |
| Mandrel Flexibility, on 1″ Mandrel | P | P | P | P |

As apparent from Table VI, the use of a resin binder containing predominantly high molecular weight polyethylene with only 25 and 35% of a low molecular weight vinyl chloride-vinyl acetate copolymer resin in a tile composition, compositions "A" and "B" respectively, results in a floor tile composition having about the same plasticity and greater than composition "D" in which the binder essentially consists of only the copolymer resin. Compositions "A" and "B" also retained to a high degree the outstanding properties of chlorinated polyethylene as demonstrated by the McBurney Indentation Recovery and Mandrel Flexibility Test. As shown in Table VI compositions "A" and "B" have an indentation recovery of 60% and 63.6% or only somewhat less than the 66.8% of the chlorinated polyethylene based tile composition and substantially greater than the 45% of composition "D" in which only the copolymer binder is employed. Similarly, composition "D" fails to pass the 1 inch Mandrel and thus the Federal standards while compositions "A," "B" and "C" pass the 1 inch Mandrel.

The increased plasticity of compositions "A" and "B" to a level about equal to and greater than composition "D" was manifested by ability to be processed on a rubber mill without exhibiting toughness or dryness during processing. In addition to a high level of indentation recovery and flexibility both compositions "A" and "B" retained to a high degree other superior tile forming properties of the chlorinated polyethylene and thus resulted in a floor tile composition of high filler content having properties equal to and in many respects substantially superior to prior art polyvinyl chloride and vinyl copolymer resin compositions of lower filler content and vastly superior to the high filler loaded copolymer resin composition "D" which formed an inferior floor tile product because it exhibited poor flexibility as demonstrated by poor indentation recovery and failure to pass the Mandrel Test.

Although certain preferred embodiments of the invention have been disclosed for purpose of illustration, it will be evident that various changes and modifications may be made therein without departing from the scope and spirit of the invention.

We claim:

1. A floor tile composed of: (A) about 100 parts by weight of a resin binder composed of from about 40% to 80% by weight of high molecular weight chlorinated polyethylene and from about 20% to 60% by weight of a low molecular weight vinyl resin selected from the group consisting of polyvinyl chloride, vinyl chloride/vinyl acetate copolymers and mixtures of polyvinyl chloride and polyvinyl acetate containing predominantly polyvinyl chloride, said chlorinated high molecular weight polyethylene being substantially amorphous and having a chlorine content of about 40–70%, an intrinsic viscosity within the range of about 1.8 to about 5.0 in o-dichlorobenzene at 100° C., and prepared by chlorination of a crystalline, low pressure, high density polyethylene having a molecular weight of at least about 1.0 million to 5.0 million and density of 0.935 to 0.985, said vinyl resin having an intrinsic viscosity within the range of about 0.2 to 1.0 in o-dichlorobenzene at 100° C. and a density of about 1.30 to 1.40; and (B) about 300–700 parts by weight filler; and (C) and about 4% to 15% by total weight of plasticizer.

2. The floor tile of claim 1 in which the resin binder is composed of about 45% to 60% by weight of the high molecular weight chlorinated polyethylene and about 40% to 55% by weight of a low molecular weight polyvinyl chloride having intrinsic viscosity within the range of about 0.2 to 0.5.

3. The floor tile of claim 1 in which there is included about 4 to 8% by total weight of plasticizer.

4. A floor tile composed of: (A) about 100 parts by weight of a resin binder composed of from about 40% to 80% by weight of high molecular weight chlorinated polyethylene and from about 20% to 60% by weight of a low molecular weight vinyl resin selected from the group consisting of polyvinyl chloride, vinyl chloride/vinyl acetate copolymers and mixtures of polyvinyl chloride and polyvinyl acetate containing predominantly polyvinyl chloride, said chlorinated high molecular weight polyethylene being substantially amorphous and having a chlorine content of about 48–65%, an intrinsic viscosity within the range of about 1.8 to about 5.0 in o-dichlorobenzene at 100° C. and prepared by chlorination of a crystalline, low pressure, high density polyethylene having a molecular weight of at least about 1.0 million to 5.0 million and density of 0.935 to 0.985, said vinyl resin having an intrinsic viscosity within the range of about 0.2 to 0.5 in o-dichlorobenzene at 100° C. and a density of about 1.30 to 1.40; (B) about 350–500 parts by weight filler; and (C) about 4–8% by total weight of plasticizer.

5. The floor tile of claim 4 in which the resin binder is composed of about 45% to 60% by weight of the high molecular weight chlorinated polyethylene and about 40% to 55% by weight of a low molecular weight polyvinyl chloride having intrinsic viscosity within the range of about 0.2 to 0.5.

References Cited

UNITED STATES PATENTS

| 3,006,889 | 10/1961 | Frey | 260—899 |
| 3,015,640 | 1/1962 | Weaver et al. | 260—31.8 |
| 3,035,038 | 5/1962 | Nolte et al. | 260—94.97 |

FOREIGN PATENTS

| 621,621 | 6/1961 | Canada. |
| 564,276 | 7/1958 | Belgium. |

WILLIAM H. SHORT, *Primary Examiner.*

V. A. MORGENSTERN, J. NORRIS,
*Assistant Examiners.*